E. E. PARKER.
HAY STACKER.
APPLICATION FILED OCT. 4, 1916.
1,229,507.
Patented June 12, 1917.
2 SHEETS—SHEET 1.
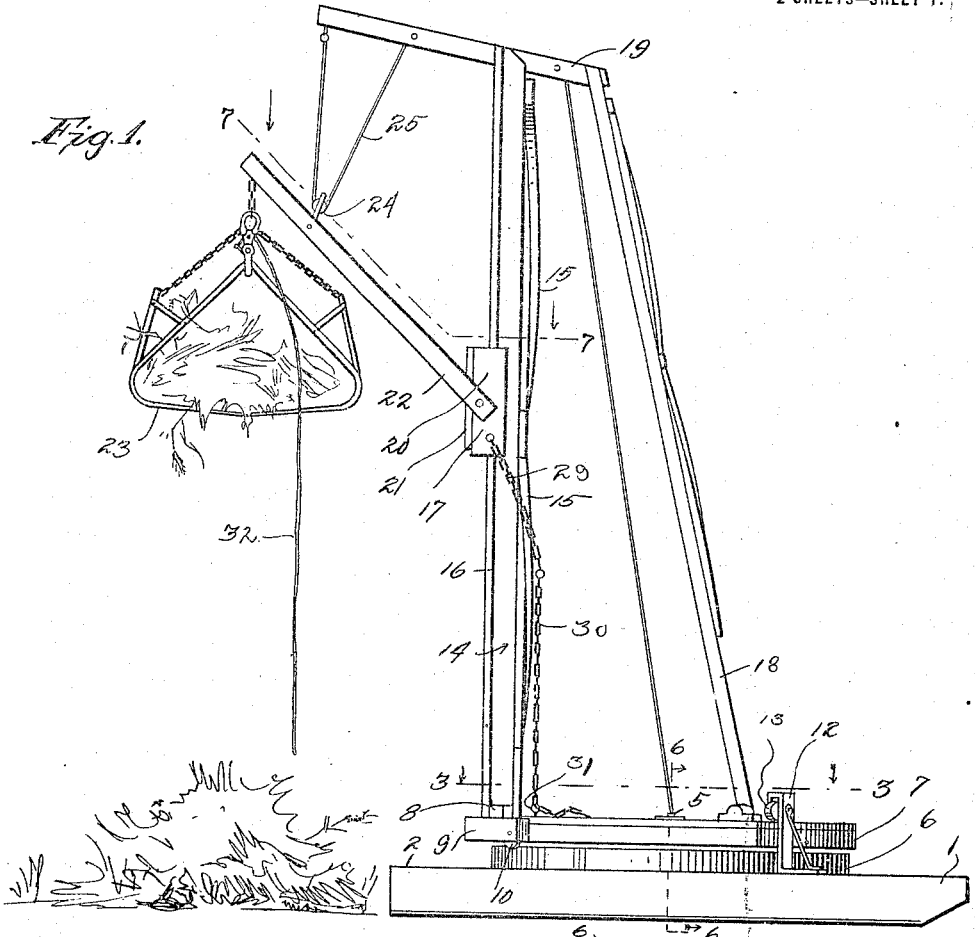
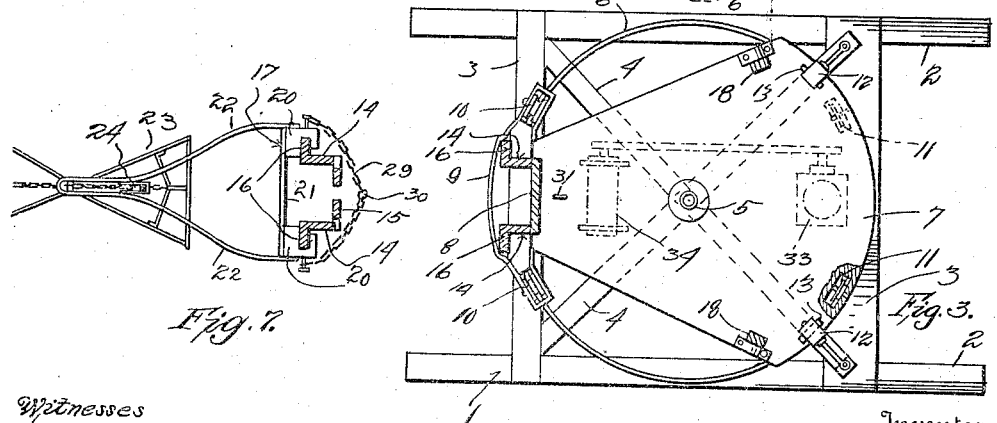

E. E. PARKER.
HAY STACKER.
APPLICATION FILED OCT. 4, 1916.
1,229,507.
Patented June 12, 1917.
2 SHEETS—SHEET 2.
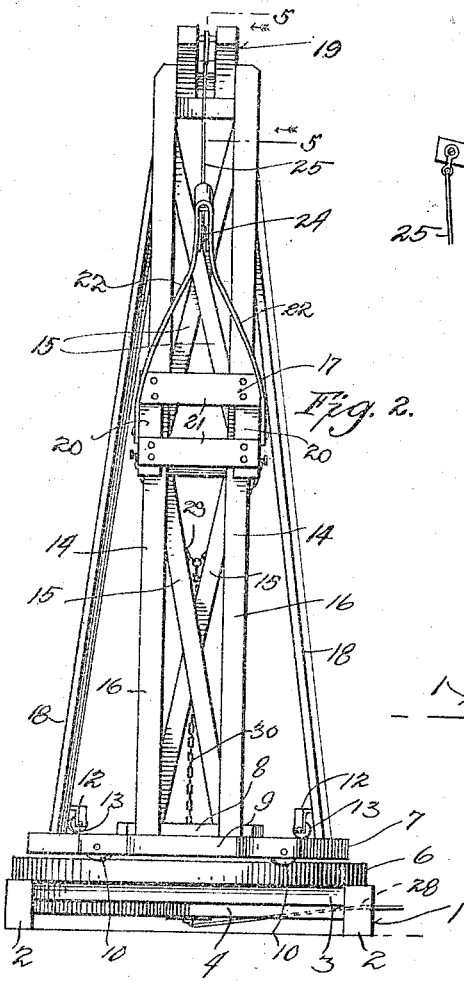
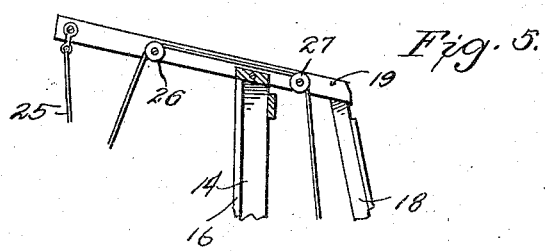
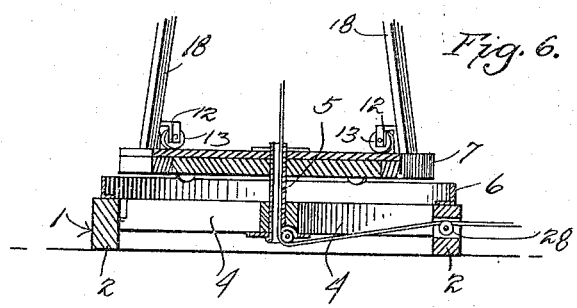
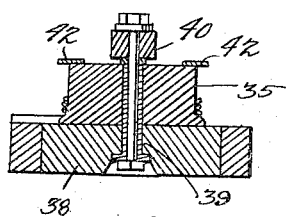
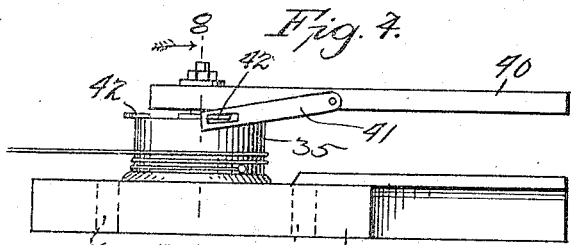
Inventor
E. E. Parker
By
Attorney

UNITED STATES PATENT OFFICE.

EZRA E. PARKER, OF GERING, NEBRASKA.

HAY-STACKER.

1,229,507.   Specification of Letters Patent.   Patented June 12, 1917.

Application filed October 4, 1916. Serial No. 123,751.

*To all whom it may concern:*

Be it known that I, EZRA E. PARKER, a citizen of the United States, residing at Gering, in the county of Scotts Bluff, State of Nebraska, have invented certain new and useful Improvements in Hay-Stackers; and I do hereby declare the following to be a full, clear, and exact description of the invention, such as will enable others skilled in the art to which it appertains to make and use the same.

This invention relates to hay-stacking machines, and has particular reference to improvements in hoisting devices for loading hay upon the top of a growing stack.

The object of my invention is to construct a hay stacking machine in the form of a hoisting derrick which is automatically dumped when the loaded fork has reached a predetermined height.

It is furthermore an object of the invention to construct a hay stacking derrick which has a more universal reach and range of action than those derricks which have been heretofore known to me.

It is also an object of the invention to provide a stacking derrick of such structure that without modification of the derrick structure *per se*, it may be adapted to be actuated by either horse or mechanical power.

With the above objects in view and such other objects as may hereinafter appear, my invention will now be fully set forth and described, reference being had to the accompanying drawings.

In the drawings,

Figure 1 is a side elevation of the derrick,

Fig. 2 is a front view thereof,

Fig. 3 is a horizontal section on line 3—3 of Fig. 1,

Fig. 4 is an elevation of the winding drum,

Fig. 5 is a vertical section on line 5—5 of Fig. 3,

Fig. 6 is a section on line 6—6 of Fig. 1,

Fig. 7 is a section on line 7—7 of Fig. 1, and

Fig. 8 is a section on line 8—8 of Fig. 4.

Referring more particularly to the drawings, 1 represents a base consisting of the longitudinal runner beams 2, the transverse sills 3 and the beams 4 diagonally crossed between the transverse sills 3. The beams 4 and the sills 3 are elevated above the lower edge of the beams 2, and at the intersection of the beams 4 a hollow or tubular bearing 5 is passed through the latter. Mounted to rotate upon the bearing 5 and upon a vertical trackway 6 which is mounted upon the base 1, is the platform 7 of suitable form though preferably preserving the general contour of a circle or a segment thereof.

The platform 7 carries at its front face a transverse block 8 around which is secured a band 9 whose ends are rearwardly and inwardly turned to provide bearings for the grooved wheels or rollers 10 which ride upon the trackway 6. The rear edge of the platform is also provided with bearings for the wheels 11 which also ride upon the trackway 6, so that the platform is freely rotatable upon the bearing 5 and upon the trackway 6. Retaining brackets 12 mounted upon the corners of the platform have the rollers 13 overlying the surface thereof to hold the platform in position upon the trackway. Rising from the front of the platform upon the block 8 as an intermediate support is a pair of spaced derrick spars 14 which are joined by the transverse and diagonal braces 15.

The spars 14 are built up so that in cross section they present the outset flanges or guide ways 16 upon which a carriage 17 rides. From the rearward portion of the platform 7 rise the brace spars 18 which are transversely joined and carry between their upper ends the rear end of a fixed beam 19 whose intermediate portion is engaged between the upper ends of the spars 14 and whose forward end overhangs the area to be covered with a stack. The spars 14 and 18 incline toward one another, so that they preserve a proper distribution of weights upon the platform 7.

The carriage 17 consists of the side blocks 20 which are grooved to receive the flanges or guide ways 16 and are transversely connected by the metallic connecting plates 21. Secured to the sides of the carriage 17 in pivoted relation are the rear ends of a pair of forwardly projecting arms 22, said arms 22 being adapted to swing vertically with relation to the carriage 17 and being joined at their forward ends to provide a support for a grapple fork 23. Between the converging portions of the arms 22 is mounted a pulley 24 under which is passed the bight of a cable 25, one of whose ends is secured to the forward extremity of the beam 19. Mounted in the beam 19 are the pulleys 26 and 27 over which the cable 25 is passed, and after leaving the pulley 27 is carried downwardly through the tubular bearing 5 and passing under the beams 4 is carried through a bearing 28 in the beam or runner 2, and thence passed to a winding device hereinafter described.

Secured to the sides of the carriage 17 are the branched ends 29 of a chain 30. The lower end of the chain 30 is suspended over the platform 7 and is adapted to be engaged with a staple or hook 31 so as to vary its length whereby the carriage 17 may be stopped at a predetermined height upon the derrick 14, in order that the hay may be positively dumped by the grappled forks. The grapple forks 23 may be of any usual or accepted form, and are released by means of a cable 32.

In some instances, it is desirable to actuate the hoist or derrick by means of mechanical power in which case an engine 33 will be located upon the platform upon the rearward portion thereof and will drive a winch 34 located just behind the spars 14, the cable 35 thus passing directly to the winch. Where the apparatus is operated with a horse actuated drum, the cable passes through the side of the base 1 as hereinbefore described and thence to a drum 35 mounted upon a base which consists of the longitudinal beams 36, the transverse beam 37 and a base block 38, the latter carrying the tubular flanged bearing 39 upon which the drum 35 loosely rotates. Also loosely mounted upon the bearing 39 is a beam 40 to which a horse may be hitched. The beam 40 carries a spring or spring-actuated plate 41 which is slotted adjacent its free end to engage with the lugs 42, a plurality of which are carried in peripheral alinement near the upper end of the drum 35. When the plate 41 is engaged with any one of the lugs and the horse is driven in the direction of the arrow, the beam 40 and the drum 35 will be connected to draw the cable 25 so as to hoist the carriage 17. When the plate 41 is disengaged from the lugs 42, the drum is free to unwind under the downward pressure of the carriage 17, at which time pressure upon the beam 40 will press the latter upon the upper surface of the drum 35 and thereby act as a brake for the latter.

The operation of my improved apparatus is evident from the foregoing. But particular attention is called to the operative relation of the carriage and the spars 14 together with the adjustable stop mechanism which is provided by the chain 30. The fact that the whole derrick mechanism is carried by the rotary platform constitutes another feature of advantage over other constructions which are known to me in that the rigidity of the derrick structure is maintained and the relation of the parts is not disturbed whatever the radial direction of the derrick arms may be.

What I claim is:—

1. A hay loader comprising in combination, a base, a platform rotatable upon said base, spars having oppositely extending guideways rising from said platform, a carriage movable upon said guideways, a grapple fork carried by said carriage, a fixed beam carried by the upper ends of said spars and overhanging the grapple fork, a cable extended from said carriage to said fixed beam and thence downwardly through said platform, and means operating from the free end of said cable for raising said carriage.

2. A hay loader, comprising in combination, a base, a rotary platform on said base, a derrick structure rising from said platform so as to be rotatable therewith, a carriage vertically movable on said derrick structure, vertically swinging arms mounted upon the carriage, a grapple carried by the extremities of the arms, means for raising said carriage upon the derrick structure, and means for adjustably limiting the upward movement of the carriage.

3. A hay loader comprising in combination, a base, a trackway carried by said base, a platform rotatable upon said trackway, spars having oppositely extending guideways rising from said platform, means for bracing said spars, a carriage movable upon said guideways, a grapple fork carried by said carriage, a fixed beam carried by the upper end of said spars and overhanging the grapple fork, a cable extending from said carriage to said fixed beam, and thence centrally through said platform, and means operating upon the free end of said cable for raising said carriage.

In testimony whereof, I affix my signature, in the presence of two witnesses.

EZRA E. PARKER.

Witnesses:
O. W. GARDNER,
FRED L. BURNS.